April 18, 1933. F. O. VAUGHN 1,904,178
BRAKE DEVICE
Filed Jan. 30, 1932 2 Sheets-Sheet 1
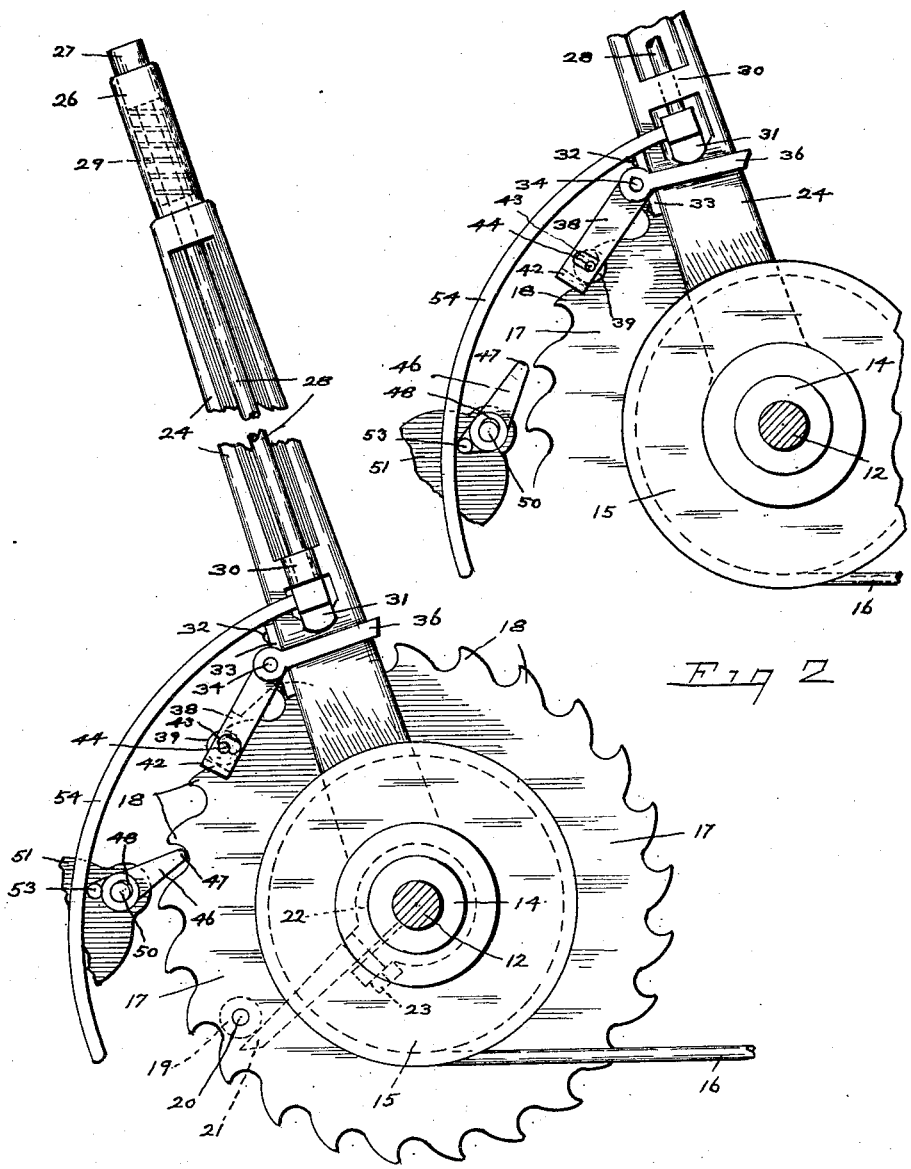
INVENTOR.
Frank O. Vaughn April 18, 1933. F. O. VAUGHN 1,904,178
BRAKE DEVICE
Filed Jan. 30, 1932 2 Sheets-Sheet 2
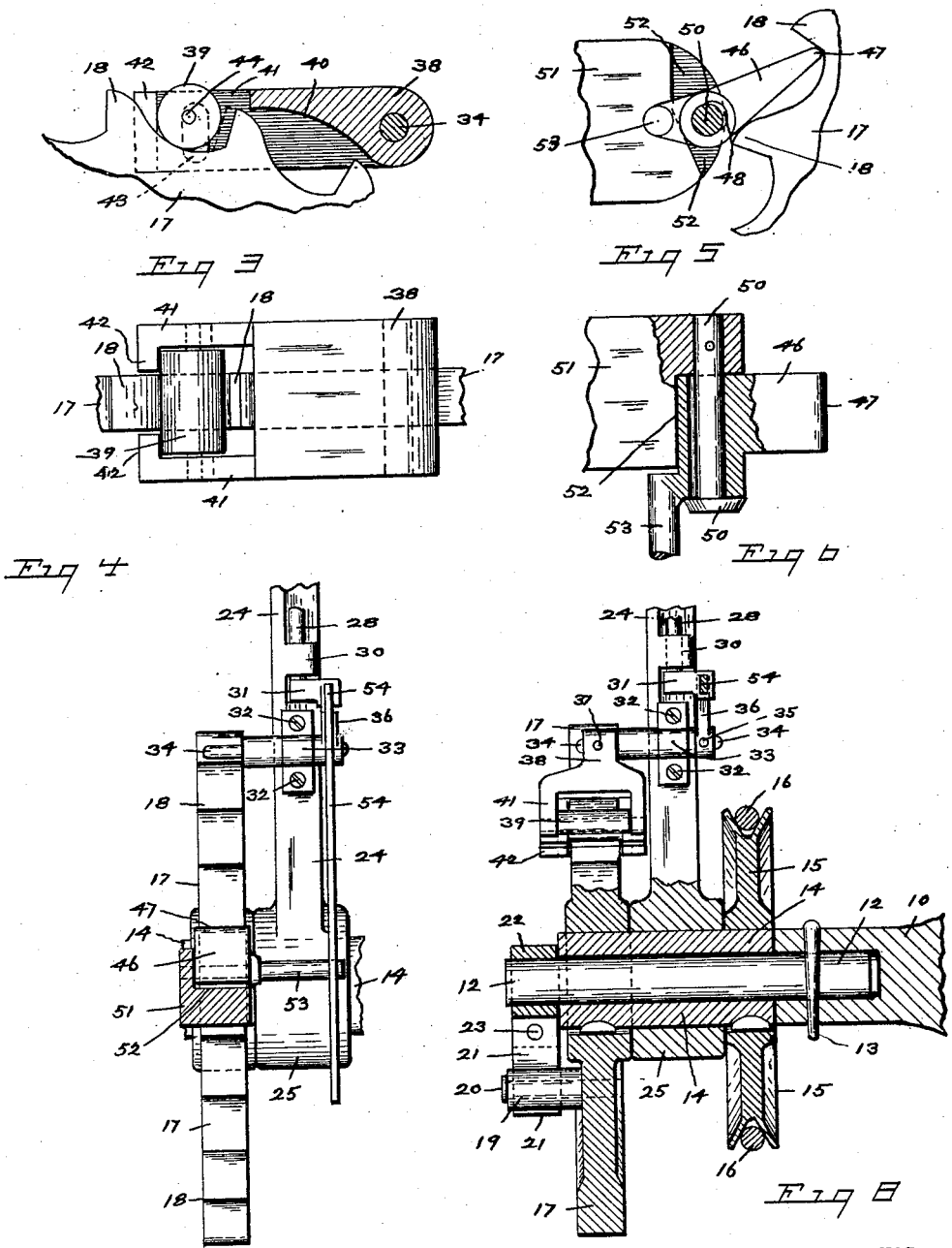
INVENTOR.
Frank O. Vaughn
BY John J Thompson
ATTORNEYS.

Patented Apr. 18, 1933

1,904,178

UNITED STATES PATENT OFFICE

FRANK O. VAUGHN, OF POUGHKEEPSIE, NEW YORK

BRAKE DEVICE

Application filed January 30, 1932. Serial No. 589,776.

This invention relates to a brake device of that class which is employed in connection with brakes on automobiles, other vehicles and also used in connection with hoisting mechanism, elevators and other machinery where a ratchet wheel and pawls are used, as the invention relates particularly to operating and holding pawls and their operation, and the invention constitutes an improvement over United States Patent No. 1,786,970 which was granted to me on December 30, 1930, for a brake mechanism.

In hand operated brakes employing a cable, it has been found that with the usual ratchet wheel and pawl that the proper tension can not be exerted upon the cable as in many cases while a certain tooth of the ratchet wheel will not bring the cable tight, the next tooth will bring it too tight, also it has been found that the actuating pawl becomes worn as also the teeth of the ratchet, and that undue strain is placed upon the stud or pin upon which the pawl is mounted.

It has also been found that in some cases the pawl will not properly seat itself between the teeth of the ratchet, thus causing a slip of the pawl or a break of the tooth.

The pawl being mounted so as to pull on the teeth in place of pushing, it will fall into the tooth more readily than if mounted in the other position.

The teeth 18 as shown in Figure 3 may be slightly undercut to prevent the accumulation of dirt.

Also the bearing 33 may be mounted in an adjustable manner so that the angle of the pawl in relation to the teeth may be changed.

The object of the invention is to provide a hand operated brake device or similar mechanism employing a ratchet wheel and pawl, whereby only one ratchet wheel is used for both the actuating pawl and the retaining pawl to act upon.

Another object of the invention is to provide an actuating pawl of novel construction whereby the tooth engaging portion is so arranged that no strain is placed upon the mounting pin, and positive seating of the pawl between the teeth is assured.

Still another object of the invention is to provide means whereby the retaining pawl is positive in its action and may be readily operated.

A further object of the invention is to provide an automatic means whereby the finger latch of the hand lever will first release the retaining pawl and then the actuating pawl by pressure thereon to release the cable.

Another object being to provide a pawl of the pull type whereby the ratchet wheel is actuated by a pull of the handle and not by the usual push on the pawl.

With these and other objects in view, my invention consists in certain novel construction and combinations of parts as will hereinafter be fully described and claimed, and illustrated in the accompanying drawings which form a part hereof and in which like figures of reference refer to corresponding parts in all of the views, and it is understood that slight changes may be made without departing from the spirit of the invention.

In the drawings—

Figure 1 shows a side elevation of the device which may be mounted on an automobile or other vehicle or machine.

Figure 2 shows a similar partial view, but with the parts in position to release the retaining pawl from contact with the teeth of the ratchet wheel.

Figure 3 shows a partial enlarged view of the actuating pawl, partly in section and its relation to the teeth of the ratchet wheel.

Figure 4 shows a top plan view of the same.

Figure 5 shows a partial side view of the retaining pawl and its mounting.

Figure 6 shows a top plan view of the same.

Figure 7 shows a partial elevation of the device with some of the parts removed and others in section.

Figure 8 shows a similar view.

Referring to the drawings, and assuming that the device is here shown as applied to the hand operated brake of an automobile employing cables to operate the brakes, a part of the engine casing is indicated by the numeral 10, which is bored as at 11 and to which is attached the stud or shaft 12 by the pin 13 or other means, and upon this pin 13 is rotatably mounted a sleeve 14, upon which and adjacent to the engine boss 10 is rigidly secured the cable or sheave wheel 15 to which is attached the cable 16 and upon which it is wound.

Near the outer end of the sleeve 14 and rigidly secured thereon is the ratchet wheel 17 which is formed with the teeth 18 which are of novel form similar to saw teeth and of a slightly hooked shape.

The limit of rotation of said ratchet wheel is limited by a stop bumper 19 mounted upon a stud 20 secured to and projecting from the side of said ratchet wheel 17 and adapted to engage with an adjustable stop arm 21 which is secured upon the outer end of the shaft 12, in such a manner that when the ratchet wheel is released by the pawls, the cable will only become slack and the ratchet wheel will not fly around.

The mounting of said stop arm 21 being effected by the split hub 22 and the bolt 23 in the usual manner, so that said arm 21 may be located to allow the required movement of the ratchet wheel.

Between the sheave wheel 15 and the ratchet wheel 17 on the sleeve 14 and having free rotary movement on said sleeve 14 is mounted the lower end of the hand lever 24 by its boss 25; said hand lever being of the usual U-shape in cross section with the handle 26 having a plunger 27 mounted therein and to which is mounted the upper end of the latch rod 28 which is normally retained in a raised position by the spring 29 surrounding the same within the handle 26.

The lower portion of the latch rod 28 extends through a guide boss 30 formed on the hand lever 24 and has secured to the lower end thereof the latch operating shoe 31.

Adjacent said shoe 31 is secured to the hand lever 24 by the screws 32 the bearing 33 within which is mounted the shaft 34, upon one end of which is secured by the pin 35 the latch lever 36, while upon the other end of said shaft 34 is secured by the pin 37 the cage 38 within which is mounted the pawl roller 39.

Said actuating pawl cage 38 comprises the solid end which is secured on the shaft 34 and the bottom of which is beveled as at 40, and the sides 41 which are formed with the hooked ends 42, the ends of which are spaced apart to allow the teeth 18 therebetween. Said sides 41 being formed with the elongated holes 43 within which are mounted the ends of the shaft 44 upon which is secured the pawl roller 39.

The holes 43 being larger than the diameter of the shaft 44 so that the pawl roller 39 has a floating movement within the cage 38, first for the purpose of effecting a perfect seat for the roller 39 between the teeth 18, and second for the purpose of eliminating all pressure or strain on the shaft 44 by transmitting all pressure of the tooth 18 upon the roller 39 directly upon the hooked ends 42 of the cage 38, thus providing a floating actuating ratchet comprising a hardened roller having long wearing properties combined with sureness of grip. The weight of the cage and roller keeping the same in contact with the teeth 18, while the same may be raised clear of the teeth 18 by a down pressure on the lever 36 as actuated by the shoe 31 and rod 28.

The retaining pawl 46 is V-shaped in form having the slightly rounded nose 47 and is formed near its rear end with the transverse hole 48 which extends through the side boss 49 and within which is the mounting pin 50 which is of slightly smaller diameter than the hole 48 and which is secured in the boss 51 (which is also a part of the engine); said boss 51 being formed with a seat 52 within which the end of the pawl may rest to take the strain off of the pin 50 while in operation, and a free movement at other times.

Said retaining pawl 46 is also provided with a stud 53 which projects from the side thereof near its rear end and which is intended for operating the same in the following manner.

The device for operating or releasing the retaining pawl 46 comprises a curved arm 54 which has its upper end secured in some suitable manner to the shoe 31, curves downward and passes the stud 53 in such a manner that by a downward movement of the rod 28 and shoe 31, said curved arm 54 will contact with the stud 53 thereby moving the same and turning the pawl 46 to disengage the end 47 from the teeth 18 and allow the ratchet wheel 17 to rotate backward as actuated by the cable 16 until its movement is limited by the arm 21 and stop bumper 19.

The operation of the device being as follows—by exerting a pull upon the hand lever towards the operator the operating ratchet will engage a tooth of the ratchet wheel and rotate the same in a direction to tighten up on the cable, the movement of the ratchet wheel being retained by the action of the retaining pawl which holds the wheel from backward movement during the opposite movement of the hand lever while the roller pawl is sliding over the teeth and engaging another tooth for another forward movement, this operation being repeated until the required tension is placed upon the cable. To release the cable, the hand lever is given a slight forward movement to disengage the tooth from the retaining pawl, the latch is then pressed down whereby the arm 54 contacts with the stud 53 and swings said pawl out of engagement with the teeth 18, and should it be desired to release the cable, by a further movement downward of the shoe the operating pawl will be raised from engagement with the teeth as well and the ratchet wheel be free to rotate or turn backward until limited by the stop.

Having thus described my invention, what I claim as new and desire to secure by Letters Patent is—

1. A hand operated brake device comprising a cable sheave and a ratchet wheel for rotating the same, a hand lever movably associated therewith for actuating the ratchet wheel, a pawl member pivoted to said hand lever in the path of travel of said ratchet wheel and means mounted on said hand lever for raising said pawl member from said ratchet wheel, said pawl member formed with a closed end and alined orifices in the sides, and a pawl comprising a roller mounted in a floating manner in said pawl member and adapted to contact both with the tooth of the ratchet wheel and the closed end of the pawl member during the operation of said pawl.

2. A brake operating device comprising in combination with a non-rotatable shaft, of a sleeve freely rotatably mounted thereon, a cable sheave and a toothed ratchet wheel rigidly secured on said sleeve and spaced apart from each other, a hand lever having a latch operating rod and pivoted on said sleeve between said sheave and said ratchet wheel and provided with a bearing having a shaft mounted therein, a pawl cage secured upon one end of said shaft in the path of travel of said ratchet wheel and formed with a closed end and alined openings in the sides thereof, a pawl roller mounted within said cage in a floating manner and in contact with said ratchet teeth and with its end extending into said alined openings and of less diameter than the diameter of said openings, a latch lever secured on the other end of said shaft and adapted to raise the pawl roller and cage by the action of the latch operating rod.

In testimony whereof I affix my signature.

FRANK O. VAUGHN.